(12) United States Patent
Moriki et al.

(10) Patent No.: US 12,497,757 B2
(45) Date of Patent: Dec. 16, 2025

(54) CONTROL SYSTEM FOR WORK MACHINE

(71) Applicant: Hitachi Construction Machinery Co., Ltd., Tokyo (JP)

(72) Inventors: Hidekazu Moriki, Mito (JP); Kazuya Sekine, Mito (JP); Yoshiaki Tsutsumi, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 184 days.

(21) Appl. No.: 18/683,543

(22) PCT Filed: Mar. 30, 2022

(86) PCT No.: PCT/JP2022/016064
§ 371 (c)(1),
(2) Date: Feb. 14, 2024

(87) PCT Pub. No.: WO2023/188132
PCT Pub. Date: Oct. 5, 2023

(65) Prior Publication Data
US 2024/0352709 A1    Oct. 24, 2024

(51) Int. Cl.
*E02F 9/20* (2006.01)
(52) U.S. Cl.
CPC .................................. *E02F 9/205* (2013.01)
(58) Field of Classification Search
CPC ........... E02F 9/205; E02F 9/2054; E02F 9/20; B60Y 2200/412
See application file for complete search history.

(56) References Cited

U.S. PATENT DOCUMENTS

| | | | |
|---|---|---|---|
| 6,247,538 B1 | 6/2001 | Takeda et al. | |
| 7,793,299 B2 * | 9/2010 | Howland | G06F 9/4881 |
| | | | 710/200 |
| 9,552,229 B2 * | 1/2017 | Baker | G06F 9/4887 |
| 2017/0314232 A1 | 11/2017 | Chi et al. | |

(Continued)

FOREIGN PATENT DOCUMENTS

| JP | 10-88625 A | 4/1998 |
|---|---|---|
| JP | 2018-39192 A | 3/2018 |

OTHER PUBLICATIONS

International Search Report (PCT/ISA/210) issued in PCT Application No. PCT/JP2022/016064 dated Jun. 21, 2022 with English translation (4 pages).

(Continued)

*Primary Examiner* — Peter D Nolan
*Assistant Examiner* — Demetra R Smith-Stewart
(74) *Attorney, Agent, or Firm* — Crowell & Moring LLP

(57) ABSTRACT

A control system 200 for a work machine includes a communication interface 18 that acquires a series of work instructions to a work machine 1 and an action control section 110 that controls an action of the work machine 1 so as to perform tasks included in the work instructions acquired by the communication interface 18. When the tasks included in the work instructions include an interrupting task to be preferentially performed and non-interrupting tasks other than the interrupting task, the action control section 110 performs the interrupting task after performing an action of the work machine 1 instructed by a task in execution.

7 Claims, 18 Drawing Sheets

(56) References Cited

U.S. PATENT DOCUMENTS

2018/0067483 A1    3/2018  Miyazaki et al.
2022/0002978 A1*   1/2022  Kurosawa .............. G06V 10/82

OTHER PUBLICATIONS

Japanese-language Written Opinion (PCT/ISA/237) issued in PCT Application No. PCT/JP2022/016064 dated Jun. 21, 2022 with English translation (6 pages).
Japanese-language International Preliminary Report on Patentability (PCT/IPEA/416 & PCT/IPEA/409) issued in PCT Application No. PCT/JP2022/016064 dated Sep. 26, 2023, including Annexes with partial English translation (15 pages).

* cited by examiner

Fig. 5

| Task | Target object | Excavation position | Loading position | Processing method |
|---|---|---|---|---|
| M1 loading | M1 | Q1 | R1 | 1 |
| M2 loading | M2 | Q2 | R2 | 1 |
| ⋮ | ⋮ | ⋮ | ⋮ | ⋮ |
| Stand-by | — | — | Stand-by position | 1 |

Fig. 6

| Task | Target object | Excavation position | Loading position | Processing method |
|---|---|---|---|---|
| M2 loading | M2 | Q2 | R2 | 2 |

Fig. 16

| Task | Target object | Number of times of work | Excavation position | Loading position | Processing method |
|---|---|---|---|---|---|
| M1 loading | M1 | N1 | Q1 | R1 | 1 |
| M2 loading | M2 | N2 | Q2 | R2 | 1 |
| ⋮ | ⋮ | ⋮ | ⋮ | ⋮ | ⋮ |
| Stand-by | — | — | — | Stand-by position | 1 |

Fig. 17

| Task | Target object | Number of times of work | Excavation position | Loading position | Processing method |
|---|---|---|---|---|---|
| M2 loading | M2 | N2 | Q2 | R2 | 2 |

CONTROL SYSTEM FOR WORK MACHINE

TECHNICAL FIELD

The present invention relates to a control system for a work machine.

BACKGROUND ART

Such a control system for a work machine has conventionally been proposed that automatically excavates a target object and automatically loads the excavated target object onto a predetermined position. For example, a control system for a work machine described in Patent Literature 1 includes an excavation target position computing means that computes an excavation target position, a loading target position computing means that computes a loading target position, an automatic positioning means that automatically positions the work machine at the computed excavation target position and the loading target position, an automatic excavation control means that automatically excavates the target object at the excavation target position, and an automatic loading control means that automatically loads the target object at the loading target position.

CITATION LIST

Patent Literature

Patent Literature 1: JP H10-88625 A

SUMMARY OF INVENTION

Technical Problem

However, the control system for the work machine described in Patent Literature 1 has such a problem that if there is a sudden work instruction such as an interrupting task to be preferentially performed, the on-site environment and the work machine setting need to be reset, which makes it difficult to handle the interrupting task.

The present invention has been made in view of the aforementioned issue, and provides a control system for a work machine capable of easily handling an interrupting task.

Solution to Problem

A control system for a work machine according to the present invention includes a work instruction acquisition section that acquires a series of work instructions to the work machine and an action control section that controls an action of the work machine so as to perform tasks included in the work instructions acquired by the work instruction acquisition section, in which in a case where a plurality of tasks included in the work instructions includes an interrupting task to be preferentially performed and non-interrupting tasks other than the interrupting task, the action control section performs the interrupting task after performing the action of the work machine instructed by a task in execution.

In the control system for the work machine according to the present invention, in a case where a plurality of tasks included in the work instructions includes an interrupting task to be preferentially performed and non-interrupting tasks other than the interrupting task, the action control section performs the interrupting task after performing the action of the work machine instructed by the task in execution, whereby the interrupting task can be easily handled.

Advantageous Effects of Invention

According to the present invention, an interrupting task can be easily handled.

BRIEF DESCRIPTION OF DRAWINGS

FIG. 5 is an example of task data included in the work instructions.
FIG. 6 is an example of an interrupting task included in the work instructions.
FIG. 16 is an example of task data included in the work instructions of a control system for the work machine according to a fourth embodiment.
FIG. 17 is an example of the interrupting task included in the work instructions of the control system for the work machine according to the fourth embodiment.

DESCRIPTION OF EMBODIMENTS

Figure 1:
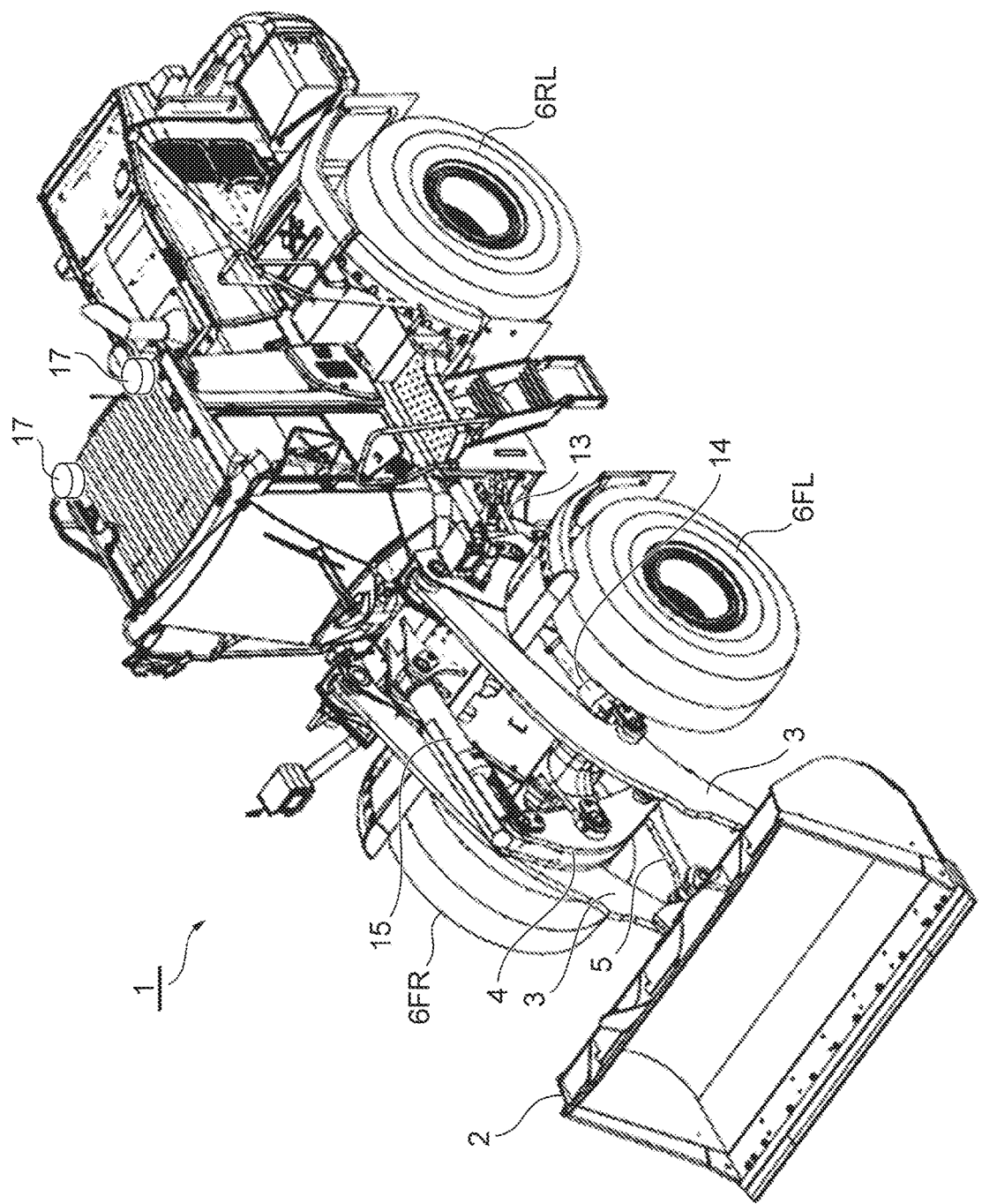
FIG. 1 is a perspective view showing a work machine.

Hereinafter, with reference to the drawings, embodiments of a control system for a work machine according to the present invention are described. The same components are assigned the same reference numerals in the descriptions of the drawings and the overlapping descriptions are omitted. Further, in the following descriptions, a wheel loader is described as an example of the work machine, but the work machine of the present invention may be a work machine such as a hydraulic shovel, without being limited to the wheel loader. Furthermore, in the following descriptions, up-down, left-right, and front-rear directions and positions are based on the direction as viewed from a driver's seat of the work machine.

Further, the control system for the work machine according to the present invention may be provided in the work machine (that is, mounted on the work machine) or may be partially or entirely provided in an external server device that can communicate with the work machine. Here, an example of mounting on the work machine is described.

First Embodiment

A control system 200 for a work machine according to the present embodiment is a system for controlling the action of a work machine 1 based on work instructions to the work machine 1 and mainly includes a communication interface 18 and an action control section 110 which are described later. Further, the communication interface 18 and the action control section 110 are each provided in the work machine 1.

Figure 2:
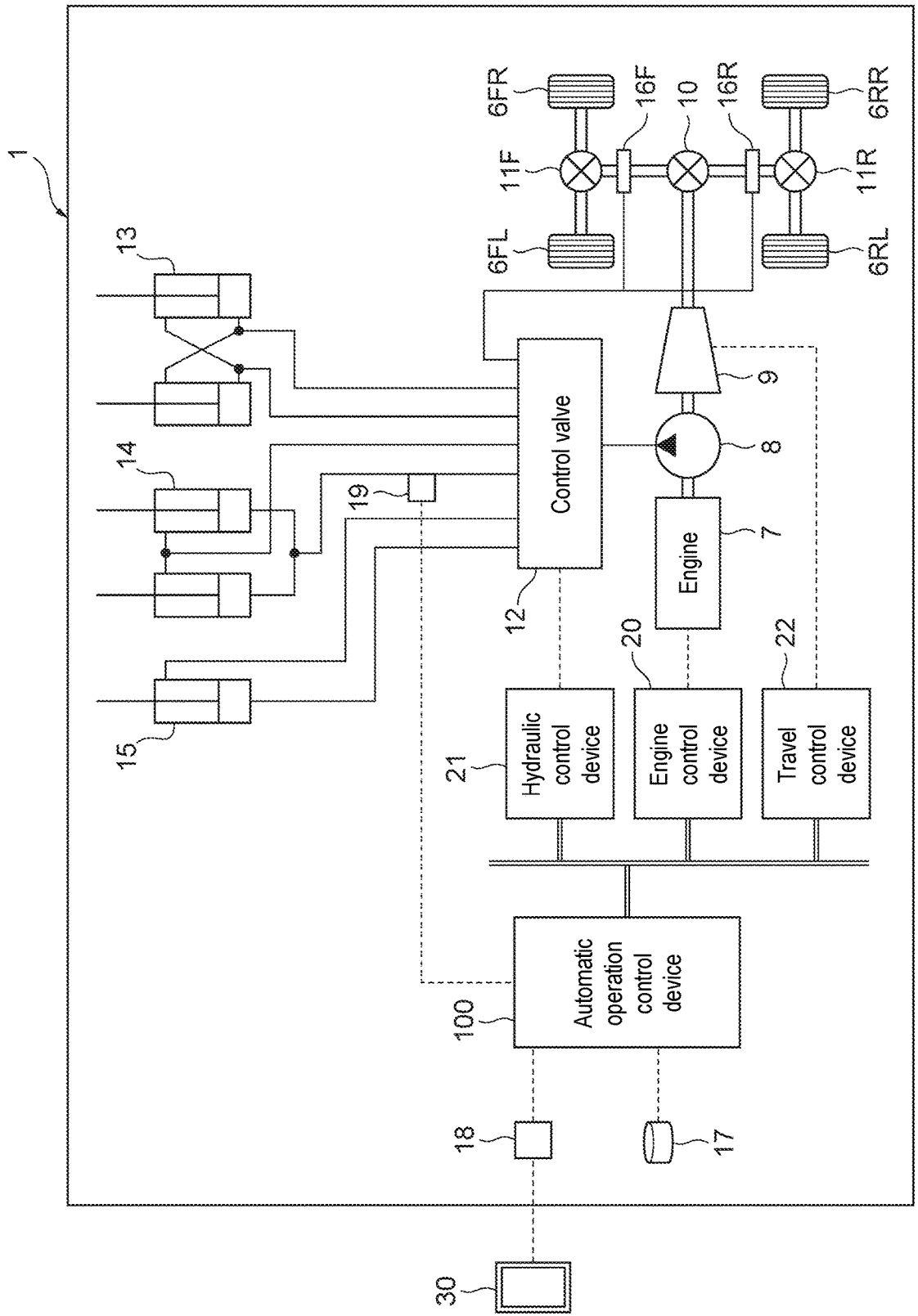
FIG. 2 is a schematic view showing the work machine.

FIG. 1 is a perspective view showing the work machine and FIG. 2 is a schematic view showing the work machine. As shown in FIG. 1, the work machine 1 is, for example, an electric motor-driven wheel loader, and includes a bucket (also referred to as a work tool) 2 disposed on the front of the work machine 1 and a pair of left and right lift arms 3 that rotatably support the bucket 2. The lift arms 3 are rotatably supported in a vehicle body of the work machine 1. When the lift arms 3 rotate, the bucket 2 moves up and down. Further, the lift arms 3 rotatably support a bell crank 4. When the bell crank 4 rotates, the bucket 2 also rotates relative to the lift arms 3 via a bucket link 5.

The work machine 1 includes a front left tire 6FL, a front right tire 6FR, a rear left tire 6RL, and a rear right tire 6RR and travels by driving these tires. Further, the work machine 1 includes an articulated steering mechanism so as to swivel by generating an angular difference between the front and the rear of the vehicle body with the vertical direction of the vehicle body as a pivot.

As shown in FIG. 2, the work machine 1 includes an engine 7 as a power source. The engine 7 drives a hydraulic pump 8 and a driving force transmission device 9. The driving force transmission device 9 transmits the driving force of the engine 7 to each of the front left tire 6FL and front right tire 6FR and the rear left tire 6RL and rear right tire 6RR via a center joint 10, a front differential 11F, and a rear differential 11R to cause the work machine 1 to travel with acceleration.

Meanwhile, the hydraulic pump 8 supplies an operating oil to a control valve 12 with the drive of the engine 7. The operating oil is distributed by means of the control valve 12 to be supplied to a steering cylinder 13, a lift cylinder 14, a bucket cylinder 15, and brakes 16F, 16R. The steering cylinder 13, the lift cylinder 14, and the bucket cylinder 15 expand and contract with the operating oil supplied, thereby changing the angle between the front and the rear of the vehicle body, the angle of the lift arms 3 relative to the vehicle body, and the angle of the bucket 2. Further, the brakes 16F, 16R close with the operating oil supplied so as to prevent the front left tire 6FL, the front right tire 6FR, the rear left tire 6RL, and the rear right tire 6RR from rotating, whereby the work machine 1 decelerates to stop.

Further, the work machine 1 includes a positioning device 17, the communication interface 18, a pressure sensor 19, an engine control device 20, a hydraulic control device 21, a travel control device 22, and an automatic operation control device 100. The positioning device 17 includes, for example, two GNSS (Global Navigation Satellite System) receivers (see FIG. 1) that measure positions by receiving signals from a positioning satellite, and outputs the measured position information on the work machine 1 to the automatic operation control device 100. It should be noted that the positioning device 17 may adopt publicly-known SLAM (Simultaneous Localization and Mapping) using a camera or a LiDAR, without being limited to the GNSS receiver.

The communication interface 18, which corresponds to a "work instruction acquisition section" described in the claims, acquires a series of work instructions to the work machine 1 from a process management terminal 30 and outputs the acquired work instructions to the automatic operation control device 100. The work instructions include task data, map data, and the like on the work, as will be described later. It should be noted that the work instruction acquisition section only needs to be capable of acquiring the work instructions from the process management terminal 30 and may also be a wireless communication device or the like other than the communication interface 18.

The pressure sensor 19 detects load information on a target object (i.e., target object to be contained in the bucket 2) loaded onto the work machine 1, based on the hydraulic pressure of the lift cylinder 14 or the stress of the lift cylinder 14, and outputs the detected load information to the automatic operation control device 100.

The automatic operation control device 100 includes, for example, a microcomputer with a combination of a CPU (Central Processing Unit) that executes computation, a ROM (Read Only Memory) as a secondary storage that records programs for the computation, and a RAM (Random Access Memory) as a temporary storage that stores computing progress and temporary control variables, and performs processing such as computation, setting, determination, and generation regarding automatic operation of the work machine 1 by executing the stored programs.

For example, the automatic operation control device 100 generates an engine control signal, a hydraulic control signal, and a travel control signal based on the work instructions from the process management terminal 30 acquired via the communication interface 18, the position information on the work machine 1 measured by the positioning device 17, and the load information detected by the pressure sensor 19, and outputs the generated engine control signal, hydraulic control signal, and travel control signal to the engine control device 20, the hydraulic control device 21, and the travel control device 23, respectively.

The engine control device 20 controls the speed of the engine 7 based on the engine control signal from the automatic operation control device 100. The hydraulic control device 21 controls the degree of opening/closing of the control valve 12 based on the hydraulic control signal from the automatic operation control device 100. The travel control device 22 controls the change gear ratio and the rotating direction of the driving force transmission device 9 based on the travel control signal from the automatic operation control device 100.

The process management terminal 30 is a terminal for transmitting the work instructions to the work machines 1 operating on-site, and may transmit the work instructions manually prepared by an on-site manager or the like, or the work instructions automatically generated by automatically acquiring the progress information on the overall work on-site by means of a sensor or the like.

Figure 3:
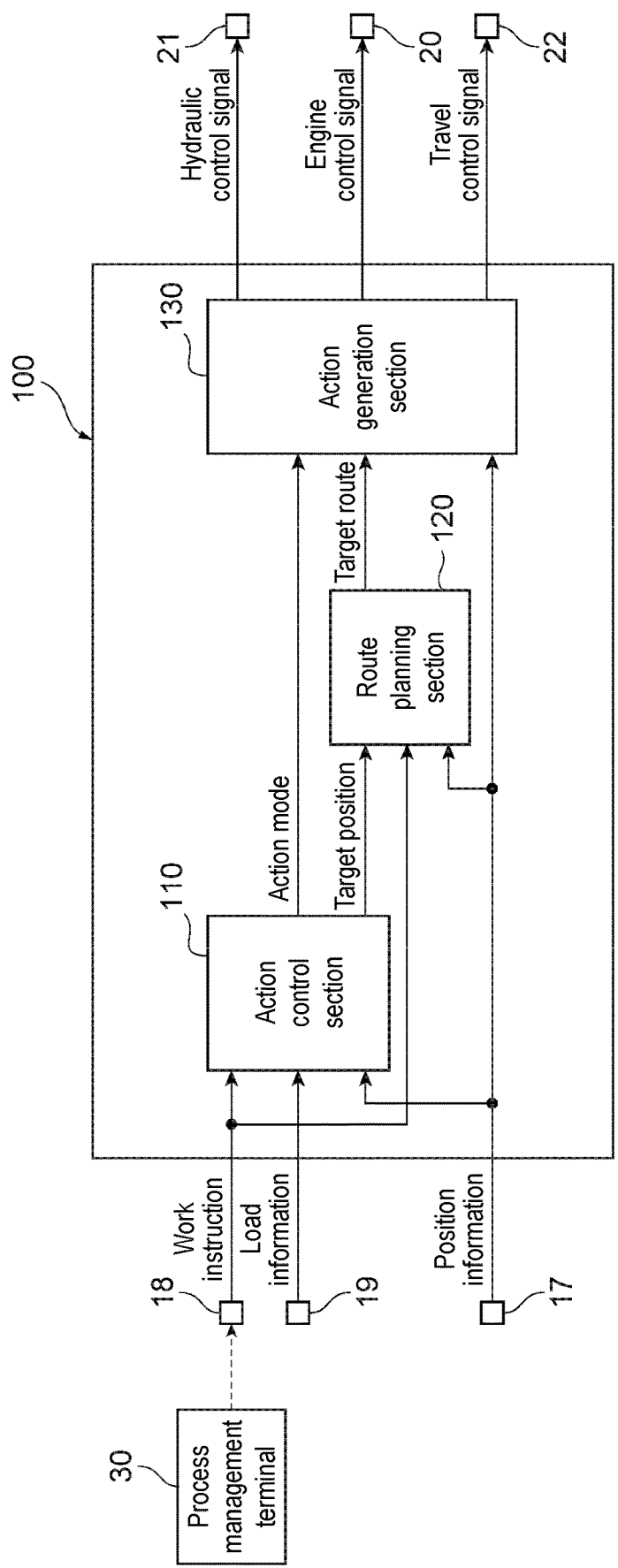
FIG. 3 is a functional block diagram showing an automatic operation control device for the work machine.

Next, the automatic operation control device 100 is described in detail based on FIG. 3. FIG. 3 is a functional block diagram showing the automatic operation control device for the work machine. As shown in FIG. 3, the automatic operation control device 100 includes an action control section 110, a route planning section 120, and an action generation section 130.

The action control section 110 includes a microcomputer with a combination of a CPU that executes computation, a ROM as a secondary storage that records programs for the computation, and a RAM as a temporary storage that stores computing progress or temporary control variables, and controls the action of the work machine 1 so that the tasks included in the work instructions acquired via the communication interface 18 are performed.

For example, the action control section 110 sets the action mode and the target position of the work machine 1 based on the work instructions from the process management terminal 30 acquired via the communication interface 18, the position information on the work machine 1 measured by the positioning device 17, and the load information detected by the pressure sensor 19. Further, the action control section 110 outputs the set action mode and the set target position to the action generation section 130 and the route planning section 120, respectively. It should be noted that the action control section 110 is described later in detail.

Examples of the action mode include a travel mode, an excavation mode, and a loading mode. Further, the "loading" referred to in the present embodiment includes loading a target object onto a loading platform of a vehicle for transport and transporting the excavated target object to a destination and dumping the excavated target object by the work machine 1. Therefore, the "loading action" referred to in the present embodiment includes the action of loading the target object onto the loading platform of the vehicle for transport and the action of transporting the excavated target object to the destination and dumping the excavated target object by the work machine 1.

The route planning section 120 sets a target route based on the work instructions from the process management terminal 30 acquired via the communication interface 18, the position information on the work machine 1 measured by the positioning device 17, and the target position set by the action control section 110. Specifically, the route planning section 120 sets the target route from the current position of the work machine 1 to the target position using the map data included in the work instructions. Further, the route planning section 120 outputs the set target route to the action generation section 130.

The action generation section 130 generates actions to control the engine control device 20, the hydraulic control device 21, and the travel control device 22, based on the action mode set by the action control section 110, the target route set by the route planning section 120, and the position information on the work machine 1 measured by the positioning device 17. Specifically, the action generation section 130 generates the travel action to cause the work machine 1 to travel from the current position of the work machine 1 so as to follow the target route, based on the target route set by the route planning section 120 and the position information on the work machine 1 measured by the positioning device 17. Further, the action generation section 130 generates the work action of the bucket 2 such as excavation and loading, based on the action mode set by the action control section 110.

Furthermore, the action generation section 130 outputs the generated travel action as a travel control signal and the generated work action as a hydraulic control signal to the travel control device 22 and the hydraulic control device 21, respectively. As with the conventional manual operation, the travel control signal may be, for example, a switching signal to switch between the amounts of operation of the accelerator and the brake and between forward and backward traveling. As with the conventional manual operation, the hydraulic control signal may be, for example, lever operation amounts of the lift arms 3 and the bucket 2. In addition, the action generation section 130 computes a required engine speed based on the generated travel action and work action, and outputs the computed results as the engine control signal to the engine control device 20.

Figure 4:
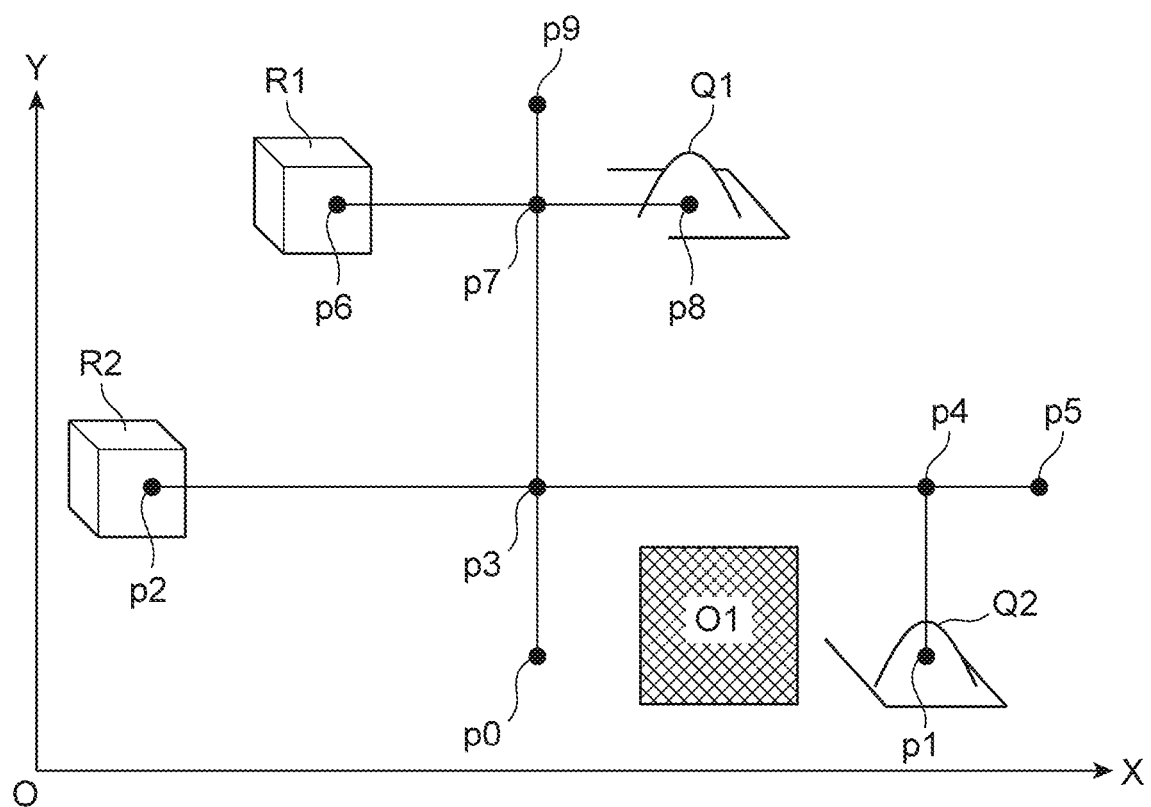
FIG. 4 is an example of map data included in work instructions.

Next, the map data and the task data included in the work instructions are described based on FIG. 4 to FIG. 6. The work instructions include each of the map data and the task data on work. The task data includes interrupting tasks to be preferentially performed and non-interrupting tasks other than the interrupting tasks. The interrupting tasks indicate tasks to be preferentially performed over the non-interrupting tasks, e.g., tasks for which a processing method described later is denoted by a numeral "2." Meanwhile, the non-interrupting tasks indicate normal tasks that are not distinguished to be prioritized (e.g., tasks for which the processing method described later is denoted by numerals "0," "1"), or tasks sequentially performed in accordance with an order described in a task instruction list.

FIG. 4 is an example of the map data included in the work instructions. As shown in FIG. 4, the map data is given as a plurality of coordinate points (p0 to p9) and line segments connecting the points. Q1 and Q2, R1 and R2, and O1 in FIG. 4 respectively indicate excavation positions, loading positions, and an obstacle. These excavation positions, loading positions, and obstacle are provided with attribute information associated with the coordinates.

FIG. 5 is an example of the task data included in the work instructions. As shown in FIG. 5, the task data is the task instruction list of the target object, excavation position, and loading position as a set. For example, in an M1 loading task, the work machine 1 excavates a target object M1 at the excavation position Q1 and loads the target object M1 onto the loading position R1, and when the loading onto the loading position R1 has ended, the M1 loading task has been completed to move on to a subsequent M2 loading task. In the M2 loading task, the work machine 1 excavates a target object M2 at the excavation position Q2 and loads the target object M2 onto the loading position R2, and when the M2 loading task has been completed, the subsequent task proceeds in accordance with the order described in the task instruction list. Then, in the last task described in the task instruction list, the work machine 1 waits at a stand-by position.

Further, as shown in FIG. 5, in the task data, the processing method is specified for each task. The processing method is denoted by numerals, for example, "0," "1," "2." In the present embodiment, for example, "0" indicates the processing method of discarding the task already acquired, and "1" indicates the processing method of sequentially performing the tasks in accordance with the order described in the task instruction list. Meanwhile, "2" indicates the processing method with a higher priority than "1," that is, the interrupting task performed preferentially over "1."

FIG. 6 is an example of the interrupting task included in the work instructions. Here, the interrupting task is specified with the numeral "2" set as the processing method. It should be noted that the interrupting task allows a temporary (in other words, sudden) interrupting process to be performed, and when a plurality of tasks is intended to be performed preferentially over the task already acquired, it is preferable to perform the interrupting tasks after discarding the task already acquired. For example, as described above, the numeral "0" is set as the processing method so as to discard the task already acquired and then, the interrupting tasks with the numeral "2" are performed.

Figure 7:
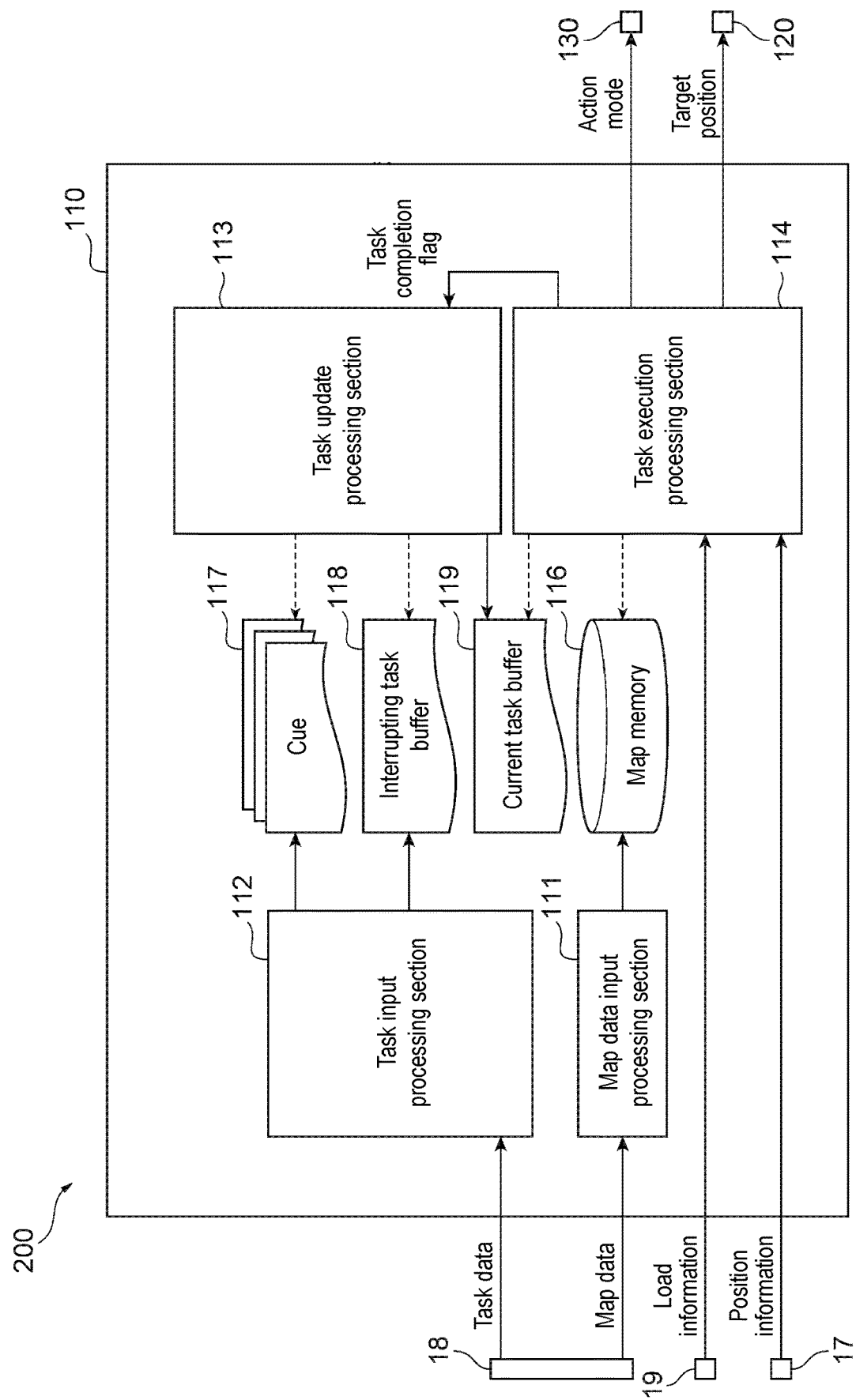
FIG. 7 is a functional block diagram showing a control system for a work machine according to a first embodiment.

FIG. 7 is a functional block diagram showing the control system for the work machine according to the first embodiment. As shown in FIG. 7, the action control section 110 of the control system 200 for the work machine includes a map data input processing section 111, a task input processing section 112, a task update processing section 113, a task execution processing section 114, a map memory 116, a cue 117, an interrupting task buffer 118, and a current task buffer 119.

As shown in FIG. 7, the communication interface 18 connected to the action control section 110 extracts each of the map data and the task data included in the work instructions acquired from the process management terminal 30 and outputs the extracted map data and the extracted task data to the map data input processing section 111 and the task input processing section 112, respectively.

The map data input processing section 111 stores the map data acquired via the communication interface 18 in the map memory 116.

The task input processing section 112 sorts the task data acquired via the communication interface 18 into interrupting tasks and non-interrupting tasks and stores the interrupting tasks and the non-interrupting tasks in the interrupting task buffer 118 and the cue 117, respectively. Specifically, the task input processing section 112 sorts the acquired tasks into the interrupting tasks (e.g., tasks for which the processing method is the numeral "2") and the non-interrupting tasks (e.g., tasks for which the processing method is the numeral "1") based on the numerals of the processing method included in the task data, and stores the interrupting tasks and the non-interrupting tasks in the interrupting task buffer 118 and the cue 117, respectively.

It should be noted that in the following descriptions, to distinguish the tasks respectively stored in the cue 117, the interrupting task buffer 118, and the current task buffer 119, the task stored in the cue 117, the task stored in the interrupting task buffer 118, and the task stored in the current task buffer 119 are occasionally referred to as the "task in the cue," "interrupting task," and "current task" or "task in execution," respectively. Further, the "task in the cue" is only the non-interrupting task, and the "current task" or "task in execution" is either the interrupting task or the non-interrupting task as the case may be.

The task execution processing section 114 sets the action mode and the target position of the work machine 1 based on the current task (i.e., task in execution) stored in the current task buffer 119, the map data stored in the map memory 116, the position information on the work machine 1 measured by the positioning device 17, and the load information detected by the pressure sensor 19. Further, the task execution processing section 114 outputs the set action mode and the set target position to the action generation section 130 and the route planning section 120, respectively. Further, when it is determined that the current task (task in execution) has been completed, the task execution processing section 114 outputs a task completion flag to the task update processing section 113. Note that the task execution processing section 114 is described later.

The task update processing section 113 updates the task in the current task buffer 119 based on the presence or absence of the task completion flag output by the task execution processing section 114, the task stored in the cue 117 (task in the cue), and the interrupting task stored in the interrupting task buffer 118.

Next, the processes performed in the action control section 110 are described in detail based on FIG. 8 to FIG. 11. Note that the processes performed in the action control section 110 are asynchronously and periodically performed. The task input processing section 112, the task update processing section 113, and the task execution processing section 114 are described below in this order.

Figure 8:
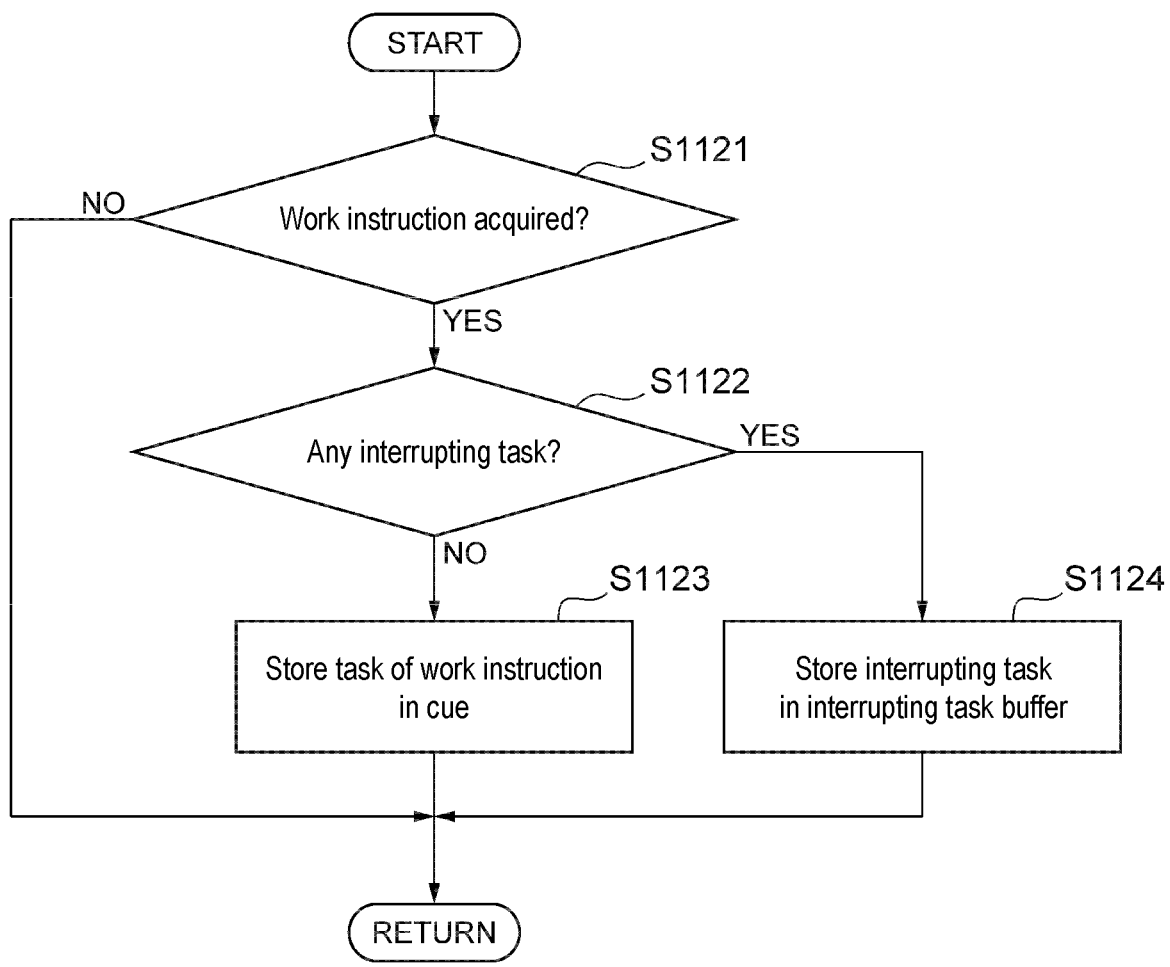
FIG. 8 is a flowchart showing a process performed in a task input processing section.

FIG. 8 is a flowchart showing the process performed in the task input processing section. As shown in FIG. 8, in step S1121, the task input processing section 112 determines whether the work instructions are acquired, based on the presence or absence of the task data from the communication interface 18. When there is task data, it is determined that the work instructions are acquired, and the process proceeds to step S1122.

In step S1122, the task input processing section 112 determines whether there is an interrupting task in the acquired task data. At this time, the task input processing section 112 sorts the acquired tasks into the interrupting tasks and the non-interrupting tasks as described above, and determines the presence or absence of the interrupting task based on the result.

When it is determined that there is no interrupting task (in other words, when all the tasks are non-interrupting tasks), the process proceeds to step S1123. In step S1123, the task input processing section 112 sequentially stores the tasks included in the work instructions in the cue 117. At this time, the task input processing section 112 stores the tasks in the cue 117 in accordance with the order described in the aforementioned task instruction list. Meanwhile, when it is determined that there is an interrupting task, the process proceeds to step S1124. In step S1124, the task input processing section 112 stores the interrupting task in the interrupting task buffer 118.

Figure 9:
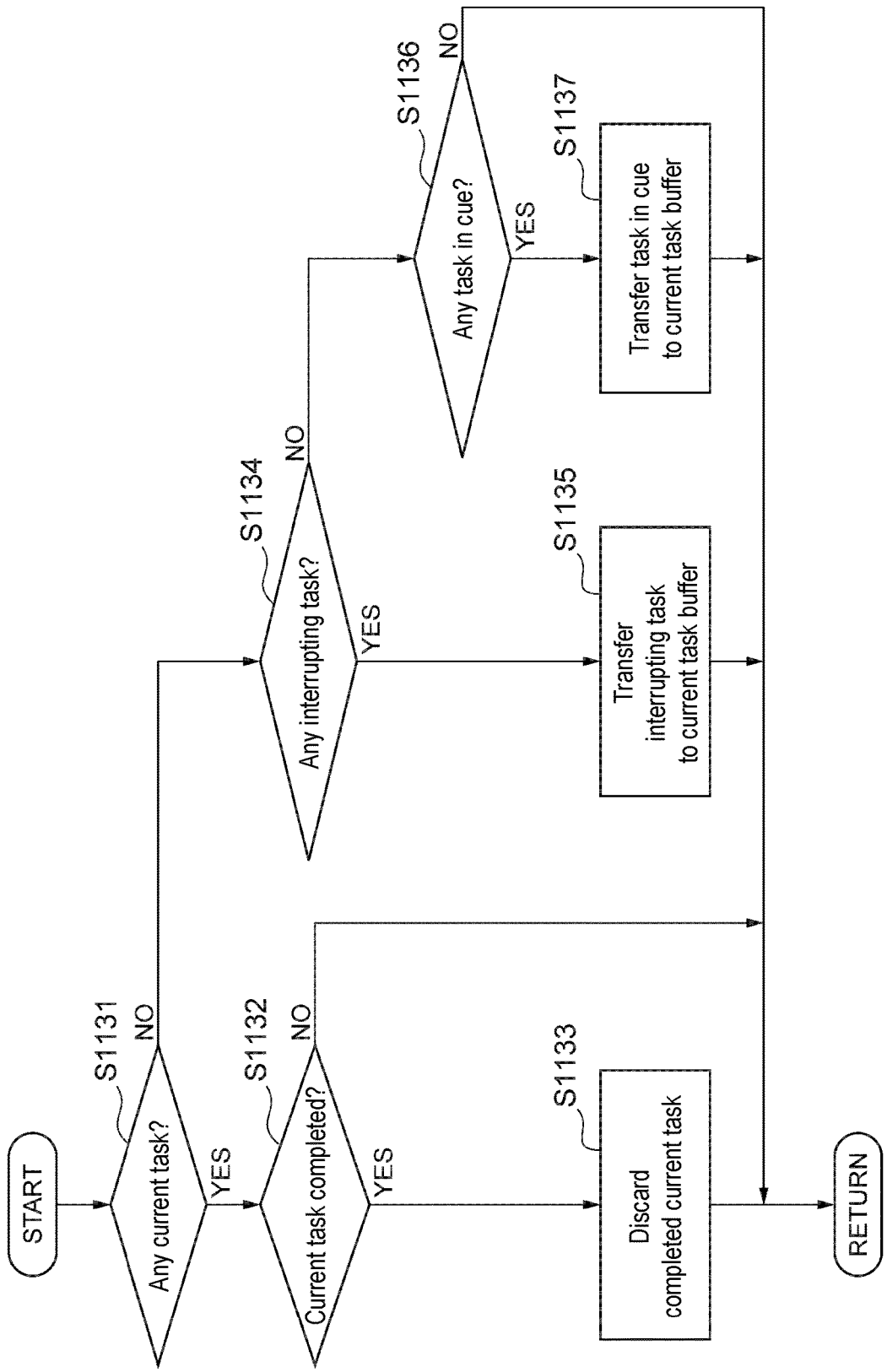
FIG. 9 is a flowchart showing a process performed in a task update processing section.

FIG. 9 is a flowchart showing the process performed in the task update processing section. As shown in FIG. 9, in step S1131, the task update processing section 113 determines whether there is a current task (i.e., task in execution) in the current task buffer 119. When it is determined that there is a current task, the process proceeds to step S1132. Meanwhile, when it is determined that there is no current task, the process proceeds to step S1134.

In step S1132, the task update processing section 113 determines whether the current task has been completed, based on the presence or absence of the task completion flag output by the task execution processing section 114. When there is the task completion flag, it is determined that the current task has been completed, and the process proceeds to step S1133. In step S1133, the task update processing section 113 discards the completed current task. Meanwhile, when there is no task completion flag, it is determined that the current task has not yet been completed, and the process "RETURNs."

In step S1134, the task update processing section 113 determines whether there is an interrupting task in the interrupting task buffer 118. When it is determined that there is an interrupting task, the process proceeds to step S1135.

In step S1135, the task update processing section 113 transfers the interrupting task stored in the interrupting task buffer 118 to the current task buffer 119 so as to update the task in the current task buffer 119. In this manner, the interrupting task stored in the interrupting task buffer 118 can be transferred to the current task buffer 119 preferentially over the tasks (i.e., non-interrupting tasks) stored in the cue 117 so as to be performed preferentially over the non-interrupting tasks.

Meanwhile, in step S1134, when it is determined that there is no interrupting task, the process proceeds to step S1136. In step S1136, the task update processing section 113 determines whether there is any task (i.e., non-interrupting task) in the cue 117. When it is determined that there is a task in the cue 117, the process proceeds to step S1137.

In step S1137, the task update processing section 113 transfers the task in the cue to the current task buffer 119. For example, the task update processing section 113 transfers the task (in other words, the task described atop the task instruction list) stored foremost among a plurality of tasks stored in the cue 117 to the current task buffer 119 so as to update the task in the current task buffer 119. In this manner, the tasks stored in the cue 117 are sequentially transferred to the current task buffer 119 and sequentially performed.

Figure 10:
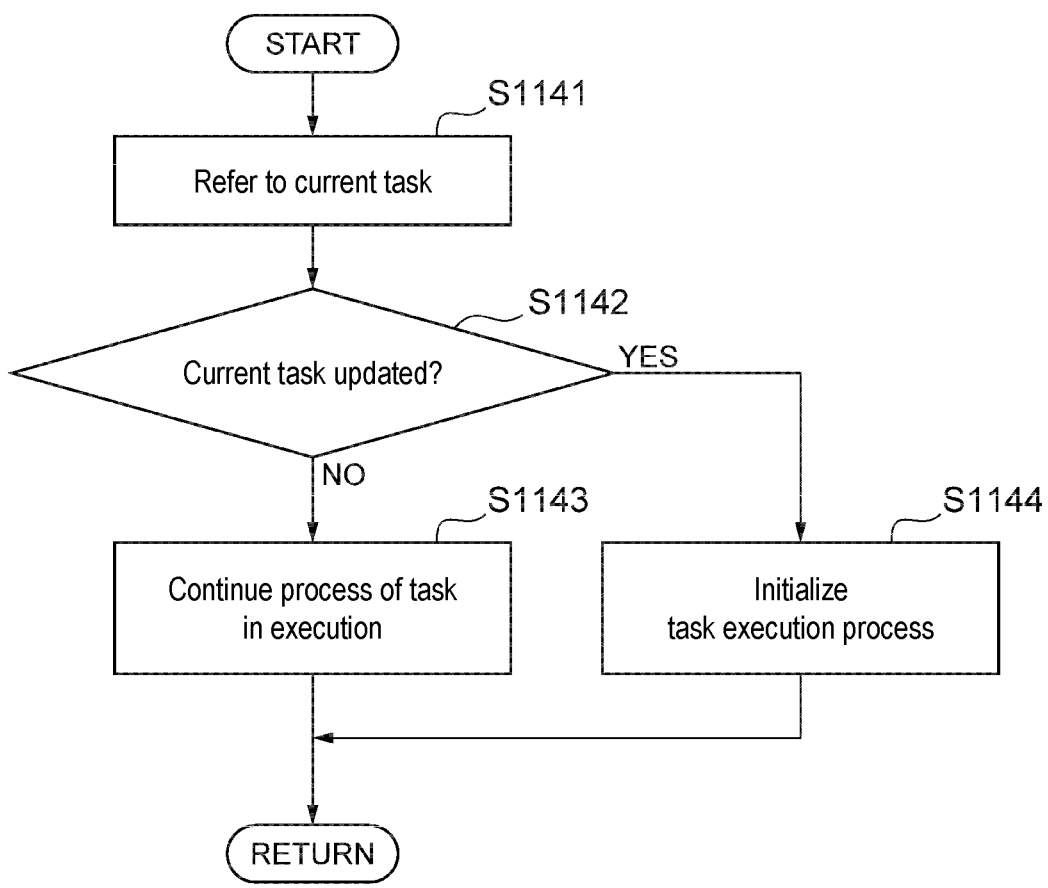
FIG. 10 is a flowchart showing a process performed in a task execution processing section.

FIG. 10 is a flowchart showing the process performed in the task execution processing section. As shown in FIG. 10, in step S1141, the task execution processing section 114 refers to the current task stored in the current task buffer 119.

In step S1142 subsequent to step S1141, the task execution processing section 114 determines whether the current task stored in the current task buffer 119 has been updated. The determination on whether the current task has been updated is made based on, for example, whether the contents of the current task have been changed. When it is determined that the current task has not yet been updated, the process proceeds to step S1143. In step S1143, the task execution processing section 114 continues the process of the current task in execution.

Meanwhile, when it is determined that the current task has been updated, the process proceeds to step S1144. In step S1144, the task execution processing section 114 initializes the task execution process. For example, in the case of the process of a loading task shown in FIG. 11 described later, the task execution processing section 114 starts the process from the START. Further, when an initial position is specified in the task, the task execution processing section 114 may perform initialization such that the work machine 1 returns to the initial position.

Figure 11:
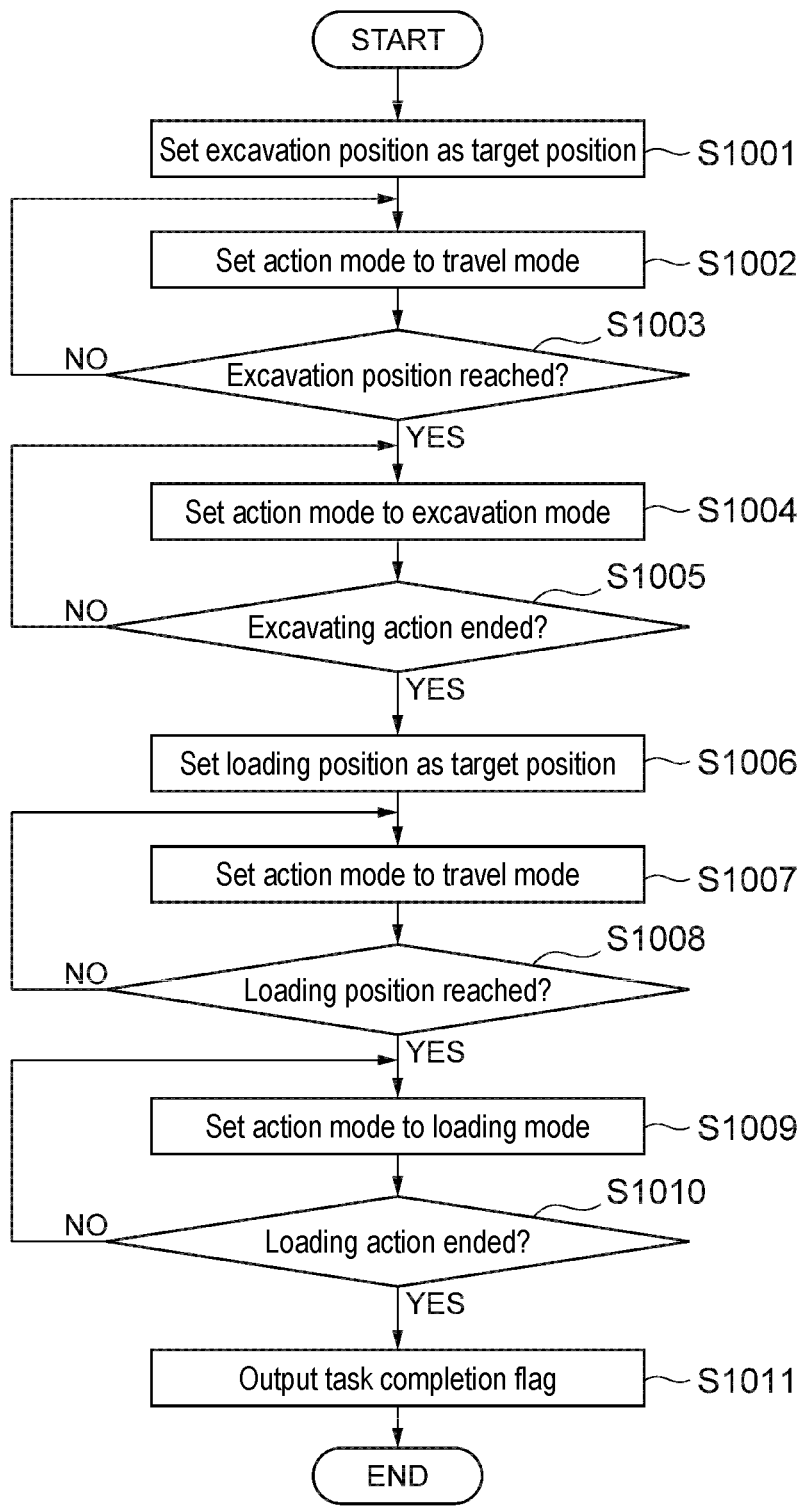
FIG. 11 is a flowchart showing a process of a loading task performed in the task execution processing section.

FIG. 11 is a flowchart showing the process of the loading task performed in the task execution processing section. Here, the M1 loading task (task in which the work machine 1 performs excavation at the excavation position Q1 and loading onto the loading position R1, and upon completion of the loading onto the loading position R1, the M1 loading task is completed) shown in FIG. 5 is described as an example. In step S1001, the task execution processing section 114 sets the excavation position described in the task data (more specifically, current task) as the target position and outputs the set target position to the route planning section 120. Specifically, the task execution processing section 114 sets the excavation position Q1 as the target position based on the excavation position Q1 described in the current task and the map data stored in the map memory 116. The set target position is, for example, the coordinate of Q1.

In step S1002 subsequent to step S1001, for traveling from the current position to the excavation position Q1, the task execution processing section 114 sets the action mode of the work machine 1 to the travel mode and outputs the set action mode to the action generation section 130.

In step S1003 subsequent to step S1002, the task execution processing section 114 determines whether the work machine 1 has reached the excavation position Q1 (i.e., target position), based on the target position set in step S1001 and the position information on the work machine 1 measured by the positioning device 17. When it is determined that the excavation position Q1 has not yet been reached, the process returns to step S1002. Meanwhile, when it is determined that the excavation position Q1 has been reached, the process proceeds to step S1004.

In step S1004, the task execution processing section 114 sets the action mode of the work machine 1 to the excavation mode in accordance with the order described in the current task and outputs the set action mode to the action generation section 130.

In step S1005 subsequent to step S1004, the task execution processing section 114 determines whether the excavating action in the excavation mode has ended, based on the load information detected by the pressure sensor 19. When it is determined that the excavating action has not yet ended, the process returns to step S1004. Meanwhile, when it is determined that the excavating action has ended, the process proceeds to step S1006. Note that the determination on whether the excavating action has ended may be made based on the information on the height and posture of the bucket 2 in addition to the load information.

In step S1006, the task execution processing section 114 sets the loading position R1 as the target position based on the loading position R1 described in the current task and the map data stored in the map memory 116, and outputs the set target position to the route planning section 120. The set target position is, for example, the coordinate of R1.

In step S1007 subsequent to step S1006, for traveling from the current position (here, excavation position Q1) to the loading position R1, the task execution processing section 114 sets the action mode of the work machine 1 to the travel mode and outputs the set action mode to the action generation section 130.

In step S1008 subsequent to step S1007, the task execution processing section 114 determines whether the work machine 1 has reached the loading position R1 (i.e., target position), based on the target position set in step S1006 and the position information on the work machine 1 measured by the positioning device 17. When it is determined that the loading position R1 has not yet been reached, the process returns to step S1007. Meanwhile, when it is determined that the loading position R1 has been reached, the process proceeds to step S1009.

In step S1009, the task execution processing section 114 sets the action mode of the work machine 1 to the loading mode in accordance with the order described in the current task and outputs the set action mode to the action generation section 130.

In step S1010 subsequent to step S1009, the task execution processing section 114 determines whether the loading action in the loading mode has ended, based on the load information detected by the pressure sensor 19. When it is determined that the loading action has not yet ended, the process returns to step S1009. Meanwhile, when it is determined that the loading action has ended, the process proceeds to step S1011. Note that the determination on whether the loading action has ended may be made based on the information on the height and posture of the bucket 2 in addition to the load information.

In step S1011, the task execution processing section 114 determines that the M1 loading task described in the current task has been completed and outputs the task completion flag to the task update processing section 113.

In the control system 200 for the work machine according to the present embodiment, in the case where a plurality of tasks included in the work instructions from the process management terminal 30 include interrupting tasks and non-interrupting tasks, the task input processing section 112 of the action control section 110 stores the interrupting tasks in the interrupting task buffer 118, and the task update processing section 113 transfers the interrupting tasks stored in the interrupting task buffer 118 to the current task buffer 119. In this manner, after performing the action (e.g., loading action) of the work machine 1 instructed by the task in execution, the interrupting tasks can be performed preferentially over the non-interrupting tasks, so that the interrupting tasks can be easily handled. In particular, since the work machine 1 is in a state with no loading after performing the loading action of the work machine 1 instructed by the task in execution, the interrupting tasks can be more easily performed.

Second Embodiment

Figure 12:
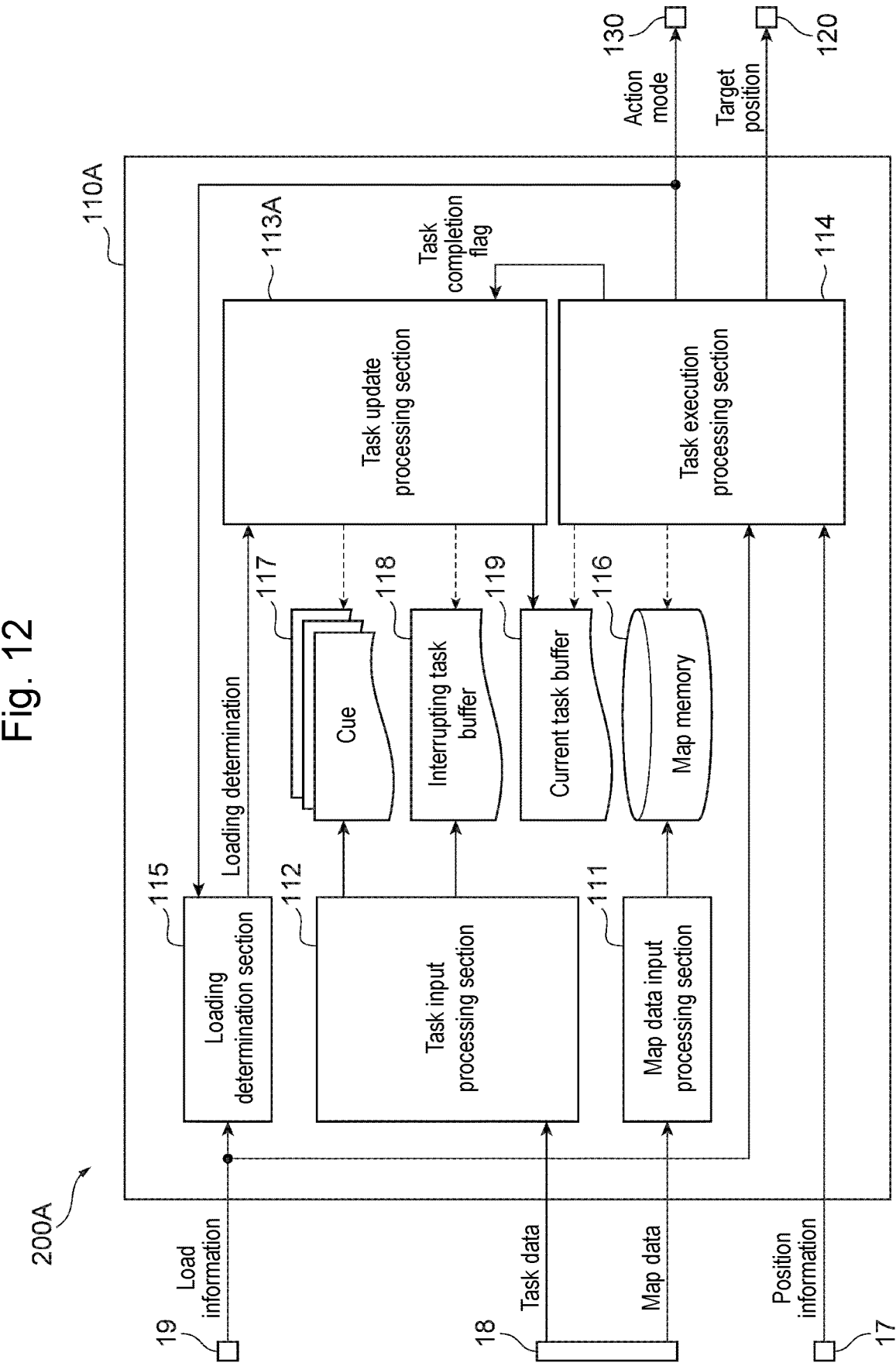
FIG. 12 is a functional block diagram showing a control system for the work machine according to a second embodiment.
Figure 13:
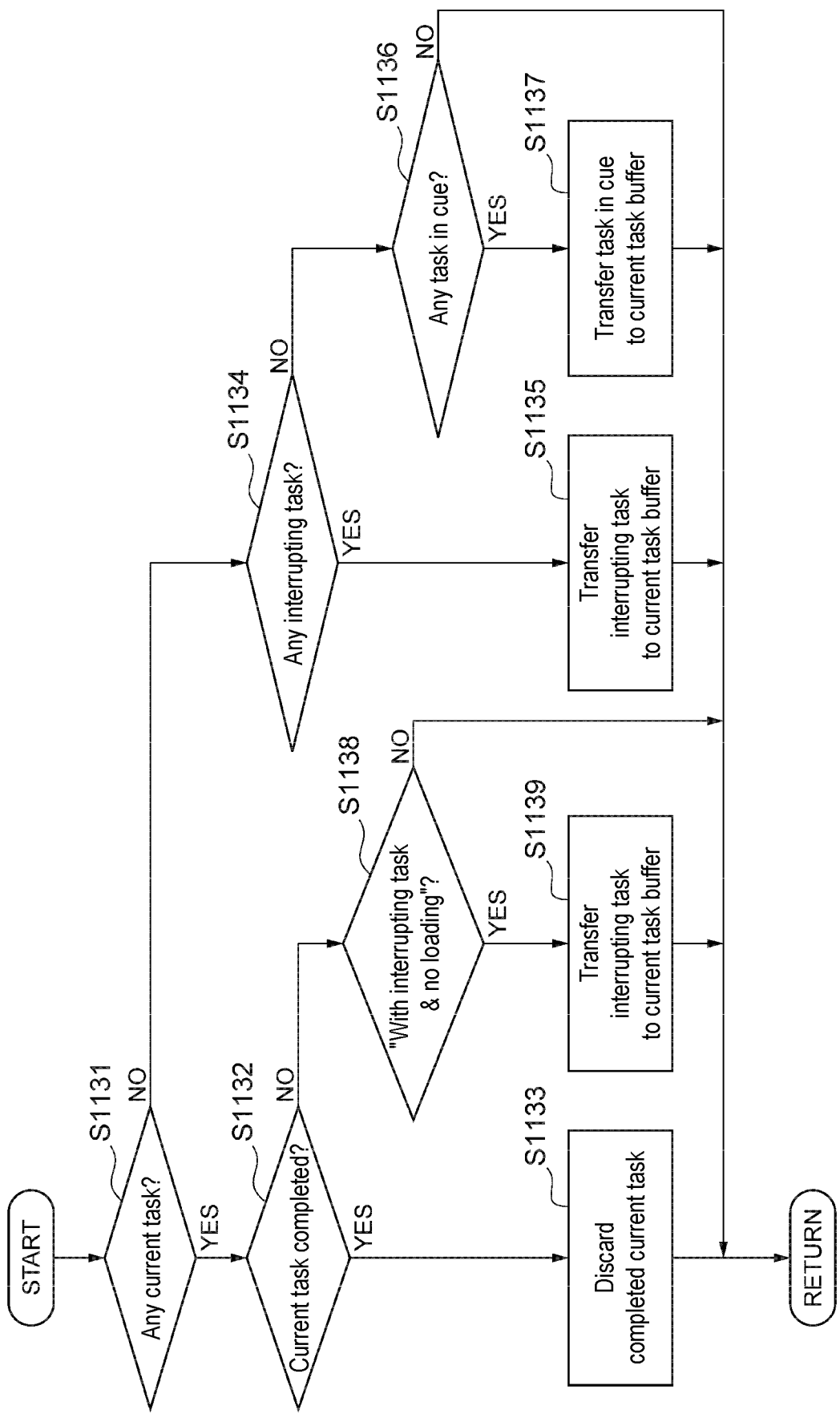
FIG. 13 is a flowchart showing a process performed in the task update processing section of the control system for the work machine according to the second embodiment.
Figure 14:
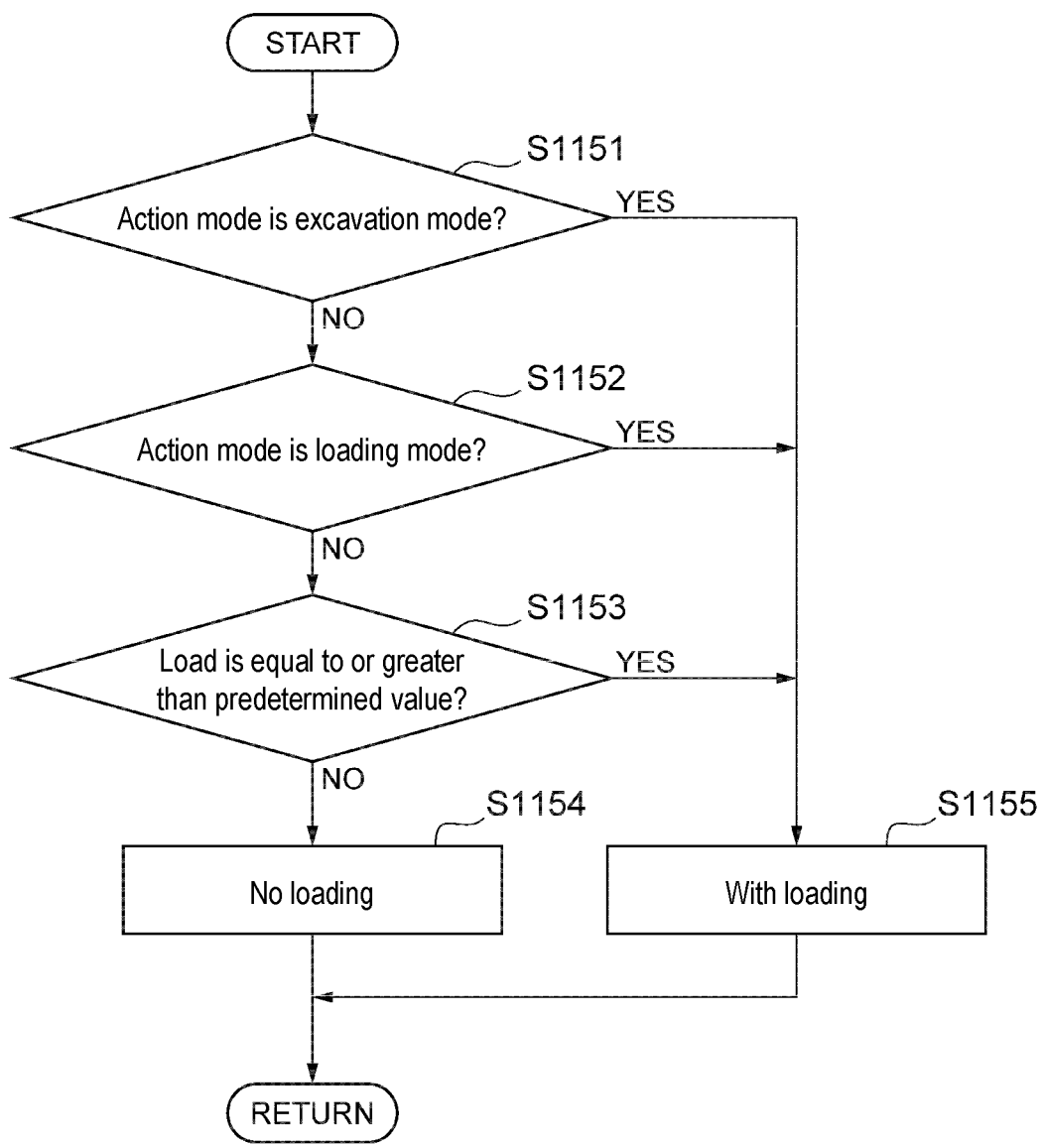
FIG. 14 is a flowchart showing a process performed in a loading determination section of the control system for the work machine according to the second embodiment.

Next, with reference to FIG. 12 to FIG. 14, a second embodiment of the control system for the work machine is described. A control system 200A for the work machine according to the present embodiment differs from the aforementioned first embodiment in that an action control section 110A further includes a loading determination section 115 and in the process contents of a task update processing section 113A. Only the differences are described below.

FIG. 12 is a functional block diagram showing the control system for the work machine according to the second embodiment. As shown in FIG. 12, the action control section 110A of the control system 200A for the work machine further includes the loading determination section 115. The loading determination section 115 determines whether the work machine 1 is loaded with a target object (in other words, with loading or no loading) based on the load information detected by the pressure sensor 19 and the action mode set by the task execution processing section 114, and outputs the determined result to the task update processing section 113A. The process performed in the loading determination section 115 is described later.

Meanwhile, the task update processing section 113A updates the task in the current task buffer 119 based on the presence or absence of the task completion flag output by the task execution processing section 114, the tasks stored in the cue 117, the interrupting tasks stored in the interrupting task buffer 118, and the result determined by the loading determination section 115.

FIG. 13 is a flowchart showing the process performed in the task update processing section of the control system for the work machine according to the second embodiment. The process shown in FIG. 13 is the process (see FIG. 9) performed in the task update processing section of the first embodiment, with step S1138 and step S1139 further added. Here, only the added step S1138 and step S1139 are described.

Specifically, when it is determined, in step S1132, that the current task has not yet been completed, the process proceeds to step S1138. In step S1138, the task update processing section 113A determines whether the work machine 1 is "with interrupting task and no loading," based on the presence or absence of the interrupting task stored in the interrupting task buffer 118 and the determined result of the loading determination section 115.

For example, when there are both interrupting task and loading, there is neither interrupting task nor loading, or there is no interrupting task, but loading, "with interrupting task and no loading" is not determined, and the process "RETURNs." Meanwhile, when "with interrupting task and no loading" is determined, the process proceeds to step S1139.

In step S1139, the task update processing section 113A transfers the interrupting task stored in the interrupting task buffer 118 to the current task buffer 119 so as to update the task in the current task buffer 119. In this manner, even in the case where the current task is not completed, when there is no loading, the interrupting task stored in the interrupting task buffer 118 is transferred to the current task buffer 119, so that the interrupting task can be immediately performed as the current task. Further, conversely, withholding execution of the interrupting task in a state with loading can prevent the action already in progress from being halted.

FIG. 14 is a flowchart showing the process performed in the loading determination section of the control system for the work machine according to the second embodiment. As shown in FIG. 14, in step S1151, the loading determination section 115 determines whether the action mode set by the task execution processing section 114 is the excavation mode. When it is determined that the mode is the excavation mode, the process proceeds to step S1155. Meanwhile, when it is determined that the mode is not the excavation mode, the process proceeds to step S1152.

In step S1152, the loading determination section 115 determines whether the action mode set by the task execution processing section 114 is the loading mode. When it is determined that the mode is the loading mode, the process proceeds to step S1155. Meanwhile, when it is determined that the mode is not the loading mode, the process proceeds to step S1153.

In step S1153, the loading determination section 115 determines whether the load is equal to or greater than a preset predetermined value, based on the load information detected by the pressure sensor 19. When it is determined that the load is equal to or greater than the predetermined value, the process proceeds to step S1155. Meanwhile, when it is determined that the load is not equal to or greater than the predetermined value, the process proceeds to step S1154.

In step S1154, the loading determination section 115 determines that there is no loading and outputs the determined result to the task update processing section 113A. In step S1155, the loading determination section 115 determines that there is loading and outputs the determined result to the task update processing section 113A. In such a manner as described above, task updates by the task update processing section 113A amid a changing loading state can be prevented by, for example, determining the presence of loading during the excavating work or the loading work.

Third Embodiment

Figure 15:
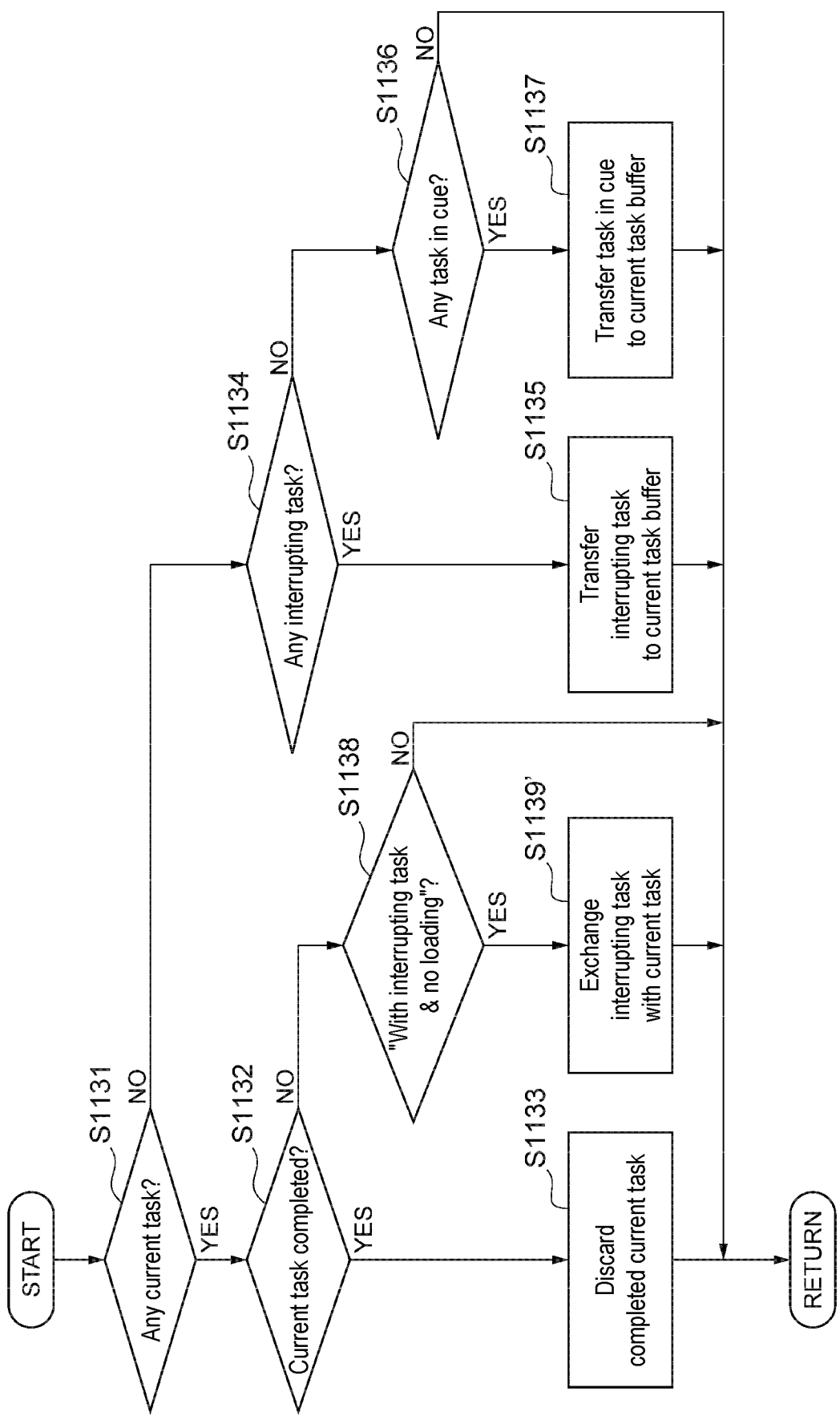
FIG. 15 is a flowchart showing a process performed in the task update processing section of a control system for the work machine according to a third embodiment.

Next, with reference to FIG. 15, a third embodiment of the control system for the work machine is described. The control system for the work machine according to the present embodiment differs from the aforementioned second embodiment in the process contents of the task update processing section 113A. Only the difference is described below.

FIG. 15 is a flowchart showing the process performed in the task update processing section of the control system for the work machine according to the third embodiment. In the process shown in FIG. 15, step S1139 of the process (see FIG. 13) of the task update processing section 113A in the second embodiment is replaced with step S1139'.

Specifically, when "with interrupting task and no loading" is determined in step S1138, the process proceeds to step S1139'. In step S1139', the task update processing section exchanges the interrupting task stored in the interrupting task buffer 118 with the current task stored in the current task buffer 119. That is, the interrupting task stored in the interrupting task buffer 118 is transferred to the current task buffer 119 and the task in execution is transferred from the current task buffer 119 to the interrupting task buffer 118.

In this manner, even when the current task in execution is not yet completed, in the case where there is no loading, the interrupting task stored in the interrupting task buffer 118 can be immediately performed as the current task. Further, the task in execution is transferred to the interrupting task buffer 118 so that after completion of the interrupting task, the task in execution can be transferred to the current task buffer 119 to be resumed.

Fourth Embodiment

Figure 18:
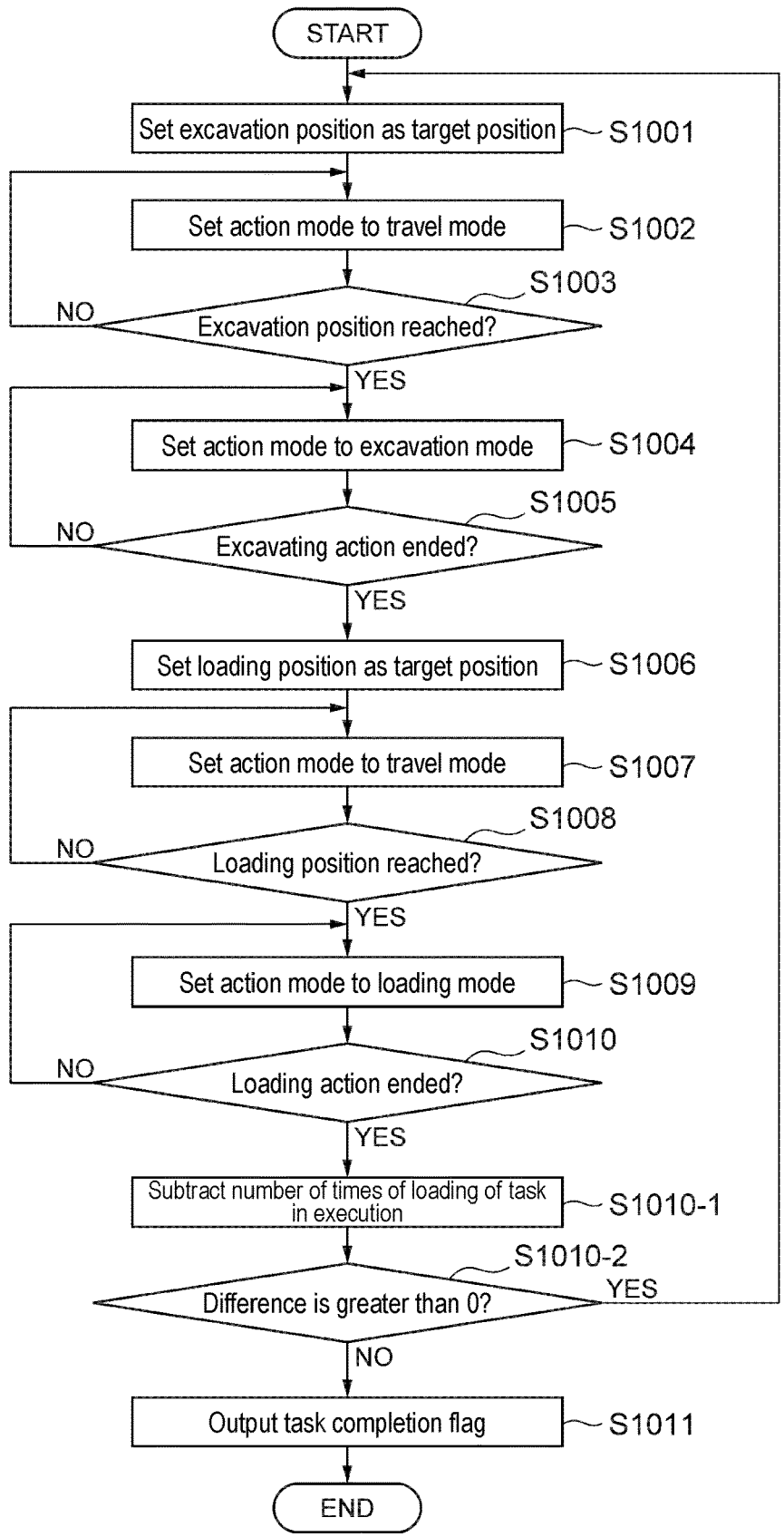
FIG. 18 is a flowchart showing a process of the loading task performed in the task execution processing section of the control system for the work machine according to the fourth embodiment.

Next, with reference to FIG. 16 to FIG. 18, a fourth embodiment of the control system for the work machine is described. The control system for the work machine according to the present embodiment differs from the aforementioned first embodiment in that an instruction on the number of times of work is added to the task data and in the process contents of the task execution processing section 114. Only the differences are described below.

FIG. 16 is an example of the task data included in the work instructions of the control system for the work machine according to the fourth embodiment, and FIG. 17 is an example of the interrupting task included in the work instructions of the control system for the work machine according to the fourth embodiment. As shown in FIG. 16, an item "Number of times of work" is added to the task data included in the work instructions of the present embodiment, in comparison with the task data (see FIG. 5) included in the work instructions of the first embodiment. Further, as shown in FIG. 17, the item "Number of times of work" is also added to the interrupting task data of the present embodiment, in comparison with the interrupting task (see FIG. 6) of the first embodiment. The "number of times of work" indicates, for example, the number of times of loading.

In this manner, in the work instruction of the M1 loading task, the work machine 1 excavates the target object M1 at the excavation position Q1 and loads the target object M1 onto the loading position R1, and when the number of times of loading has reached N1, the M1 loading task is completed to then move on to the subsequent M2 loading task. Further, the interrupting task is also similarly performed. When the number of times of loading is specified as such, the task is performed until the specified number of times of loading is reached. It should be noted that in place of the "number of times of work," the "work amount" (e.g., loading amount) may be specified.

FIG. 18 is a flowchart showing the process of the loading task performed in the task execution processing section of the control system for the work machine according to the fourth embodiment. As shown in FIG. 18, the process of the loading task performed in the task execution processing section 114 of the present embodiment is the process (see FIG. 11) of the loading task of the first embodiment, with step S1010-1 and S1010-2 further added.

Step S1010-1 and S1010-2 are added between step S1010 and S1011. Specifically, when it is determined that the loading action has ended in step S1010, the process proceeds to step S1010-1. In step S1010-1, the task execution processing section 114 subtracts the number of times of loading of the task in execution. At this time, the task execution processing section 114 subtracts the number of times of loading of the ended loading action from the number of times of work (here, the number of times of loading) included in the task data (more specifically, current task).

In step S1010-2 subsequent to step S1010-1, the task execution processing section 114 determines whether the difference obtained through the subtraction is greater than 0. When it is determined that the difference is greater than 0, the process returns to step S1001. Meanwhile, when it is determined that the difference is equal to or smaller than 0, the process proceeds to step S1011. In step S1011, the task execution processing section 114 outputs the task completion flag.

In the control system for the work machine according to the present embodiment, the task execution processing section 114 subtracts the number of times of loading of the ended loading action from the number of times of work (number of times of loading) included in the task data, so that in the case where after performing the interrupting task in the middle of the task in execution, the task in execution previously performed is resumed, the number of times of loading reflecting the number of times of loading already ended can be set for the task in execution previously performed. For example, when the interrupting task is preferentially performed in the middle (for example, at the point where the number of times of loading of the ended loading action is three) of the M1 loading task (for example, the number of times of loading N1=5) and after performing the interrupting task, the M1 loading task previously performed is resumed, the task execution processing section 114 controls the work machine 1 so as to perform the remaining two times of loading action (N1−3=5−3=2) of the M1 loading task to be resumed. Note that when the loading amount is used in place of the number of times of loading, it is only necessary to measure the amount of the target object after ending the excavating action and prior to starting the loading action and subtract the loading amount in the same manner as in the number of times of loading.

In the aforementioned embodiments, the control system 200, 200A for the work machine mounted on the work machine 1 has been described as an example, but for example, the communication interface 18 and the action control section 110, 110A may be provided in an external server device or the like configured to be capable of communicating with each of the process management terminal 30 and the work machine 1, or only the action control section 110, 110A may be provided in the external server device or the like. With such variations, the control system 200, 200A for the work machine can be variably installed in accordance with the conditions, so that the control system 200, 200A for the work machine can be more versatile.

The embodiments of the present invention have been described above in detail, but the present invention is not limited to the aforementioned embodiments and various design changes can be made within the scope without departing from the spirit of the present invention described in the claims. Further, the aforementioned embodiments have been described in detail for easier understanding of the present invention, and are not necessarily limited to those including all the described configurations.

REFERENCE SIGNS LIST

1 Work machine
2 Bucket
3 Lift arm
4 Bell crank

5 Bucket link
7 Engine
8 Hydraulic pump
9 Driving force transmission device
10 Center joint
12 Control valve
13 Steering cylinder
14 Lift cylinder
15 Bucket cylinder
17 Positioning device
18 Communication interface
19 Pressure sensor
20 Engine control device
21 Hydraulic control device
22 Travel control device
30 Process management terminal
100 Automatic operation control device
110, 110A Action control section
111 Map data input processing section
112 Task input processing section
113 Task update processing section
114 Task execution processing section
115 Loading determination section
116 Map memory
117 Cue
118 Interrupting task buffer
119 Current task buffer
120 Route planning section
130 Action generation section
200, 200A Control system for work machine

The invention claimed is:

1. A control system for a work machine, the control system comprising:
a work instruction acquisition section that acquires a series of work instructions to the work machine;
an action control section that controls an action of the work machine so as to perform tasks included in the work instructions acquired by the work instruction acquisition section; and
a loading determination section that determines whether the work machine is loaded with a target object,
wherein in a case where a plurality of tasks included in the work instructions includes an interrupting task to be preferentially performed and non-interrupting tasks other than the interrupting task, the action control section performs the interrupting task after performing the action of the work machine instructed by a task in execution when the loading determination section determines that the work machine is loaded with the target object and performs the interrupting task before completion of the action of the work machine instructed by the task in execution when the loading determination section determines that the work machine is not loaded with the target object.

2. The control system for the work machine according to claim 1, wherein
the action control section comprises:
a task input processing section that sorts the plurality of tasks included in the work instructions acquired by the work instruction acquisition section into the interrupting task and the non-interrupting tasks;
an interrupting task buffer that stores the interrupting task;
a cue that stores the non-interrupting tasks in accordance with an order instructed by the work instructions;
a current task buffer that stores the task in execution;
a task execution processing section that sets an action mode and a target position of the work machine based on the task in execution that is stored in the current task buffer, map data included in the work instructions, position information on the work machine, and load information on the target object loaded onto the work machine, the task execution processing section outputting a task completion flag when the task in execution is completed; and
a task update processing section that updates a task in the current task buffer based on presence or absence of the task completion flag output by the task execution processing section, the non-interrupting tasks stored in the cue, and the interrupting task stored in the interrupting task buffer,
wherein the task update processing section updates the task in the current task buffer by preferentially transferring, to the current task buffer, the interrupting task stored in the interrupting task buffer over the non-interrupting tasks stored in the cue.

3. The control system for the work machine according to claim 2,
wherein
the loading determination section determines whether the work machine is loaded with the target object, based on the load information on the target object loaded onto the work machine, and the action mode set by the task execution processing section, and outputs a determined result to the task update processing section, and
when it is determined that the work machine is not loaded with the target object, and the interrupting task is stored in the interrupting task buffer, the task update processing section transfers the interrupting task stored in the interrupting task buffer to the current task buffer.

4. The control system for the work machine according to claim 3, wherein the task update processing section transfers the interrupting task stored in the interrupting task buffer to the current task buffer and transfers the task in execution from the current task buffer to the interrupting task buffer.

5. The control system for the work machine according to claim 2, wherein
the work instructions include an instruction on an amount of work or a number of times of work, and
in a case where after performing the interrupting task in a middle of the task in execution, the task in execution previously performed is resumed, the task execution processing section sets a remaining amount of work or a remaining number of times of work reflecting the amount of work or the number of times of work already ended for the task in execution previously performed.

6. The control system for the work machine according to claim 1, wherein
the action of the work machine includes a loading action, and
the action control section performs the interrupting task after performing the loading action of the work machine instructed by the task in execution.

7. The control system for the work machine according to claim 1, wherein the work instruction acquisition section and the action control section are provided in the work machine or an external server device that can communicate with the work machine.

* * * * *